United States Patent [19]

Hiller

[11] 4,235,879

[45] * Nov. 25, 1980

[54] ANIMAL FEEDS CONTAINING A MIXTURE OF VIRGINIAMYCIN, ZINC BACITRACIN OR FLAVOPHOSPHOLIPOL AND PROTEOLYTIC ENZYMES

[75] Inventor: Günter Hiller, Erkrath, Fed. Rep. of Germany

[73] Assignee: Henkel Kommanditgesellschaft auf Aktien, Düsseldorf-Holthausen, Fed. Rep. of Germany

[*] Notice: The portion of the term of this patent subsequent to Aug. 19, 1980, has been disclaimed.

[21] Appl. No.: 5,482

[22] Filed: Jan. 22, 1979

Related U.S. Application Data

[63] Continuation-in-part of Ser. No. 814,047, Jul. 8, 1977, abandoned, and a continuation-in-part of Ser. No. 814,048, Jul. 8, 1977, abandoned, and a continuation-in-part of Ser. No. 847,793, Nov. 2, 1977, abandoned, and a continuation-in-part of Ser. No. 952,410, Oct. 18, 1978.

[30] Foreign Application Priority Data

Jul. 23, 1976 [DE] Fed. Rep. of Germany ....... 2633105
Jul. 23, 1976 [DE] Fed. Rep. of Germany ....... 2633106
Nov. 2, 1976 [DE] Fed. Rep. of Germany ....... 2650277

[51] Int. Cl.$^3$ .................... A23K 1/165; A23K 1/17

[52] U.S. Cl. ..................... 424/94; 424/177; 426/2; 426/53; 426/623; 426/630; 426/807

[58] Field of Search ................ 426/2, 31, 43, 53, 623, 426/630, 635, 807; 424/94, 177

[56] References Cited

U.S. PATENT DOCUMENTS

| | | | |
|---|---|---|---|
| 2,809,892 | 10/1957 | Chornock | 424/177 |
| 3,455,696 | 7/1969 | Ukita et al. | 426/31 |
| 4,062,732 | 12/1977 | Lehmann et al. | 426/53 X |

OTHER PUBLICATIONS

The Merck Index, Ninth Edition, Windholz (Editor), Merck & Co. Publishers, 1976, pp. 126, 1285 & 1307.

*Primary Examiner*—R. B. Penland
*Attorney, Agent, or Firm*—Hammond & Littell, Weissenberger and Muserlian

[57] ABSTRACT

Animal feeds based on carbohydrates, protein, fats and, optionally, conventional additives, containing from 5 to 150 ppm of one of the antibiotics Virginiamycin, zinc Bacitracin or flavophospholipol and a content of proteolytic enzymes in such an amount that the enzymatic activity is from 0.05 to 2.5 mTU/gm of said animal feed, wherein the animal feed contains up to 20% less, based on corresponding conventional animal feeds, of essential food components and consequently possibly of the convertible energy of the animal feed, and the method of rearing animals with such feeds.

5 Claims, No Drawings

ANIMAL FEEDS CONTAINING A MIXTURE OF VIRGINIAMYCIN, ZINC BACITRACIN OR FLAVOPHOSPHOLIPOL AND PROTEOLYTIC ENZYMES

RELATED APPLICATIONS

This application is a continuation-in-part application of United States Patent Applications Ser. Nos. 814,047 and 814,048, both filed on July 8, 1977, now abandoned in favor of Serial No. 952,410, filed Oct. 18, 1978, and also a continuation-in-part of pending United States Patent Application Ser. No. 847,793, filed Nov. 2, 1977, now abandoned.

BACKGROUND ART

High potency animal feeds, as they are normally used today in intensive animal raising, contain a number of additives of prophylactic and/or nutritive effect. These include among others anitbiotics and enzymes. While the use of antibiotics has found acceptance in mixed feeds of all kinds, enzymes are not as yet used on a large scale in the field.

The feed mixtures used in modern intensive animal raising programs are generally optimized in all nutrient components to the extent that further improvement does not seem readily possible.

Thus, U.S. Pat. No. 3,017,272 suggests the use of from 1 to 200 ppm of Virginiamycin in feeds; U.S. Pat. No. 2,809,892 suggests the use of from 1 to 25 ppm of zinc Bacitracin in feeds; U.S. Pat. No. 4,062,732 suggests the use of certain acid proteases in feed, and U.S. Pat. No. 3,455,696 suggests the use of procain penicillin, dehydrostreptomycin or tetracycline and an adic protease in feeds.

United States Patent Applications Ser. No. 814,047 and 814,048, both filed on July 8, 1977, and Ser. No. 952,410, filed Oct. 18, 1978, relate to the discovery of animal food mixtures based on carbohydrates, proteins, fats and, in any given case, the usual kinds of additives, whose nutrient value is optimized through the addition of 5 to 150 ppm of the antibiotics Virginiamycin, zinc Bacitracin or flavophospholipol and of proteolytic enzymes in such an amount that the enzymatic activity is from 0.05 to 2.5 mTU/gm of said animal food mixture. These animal food mixtures result in higher yields with respect to their feed utilization and/or the weight increase produced by them than those obtained using conventional high-potency animal feeds, which contain only antibiotics or enzymes by themselves.

OBJECTS OF THE INVENTION

An object of the present invention is the development of a mixture of antibiotics and enzymes which improves the efficiency of animal feeds.

Another object of the present invention is the development of a mixture of antibiotics and enzymes which, when added to an otherwise substandard animal feed, optimizes the potency of said animal feed and transforms it into a feed having a standard nutritional capacity.

A further object of the invention is the development of an animal feed which is superior to standard rated animal feeds in its capacity to promote growth and nutrient utilization comparable to that attainable by said standard animal feeds with a substantially lower content of proteins and essential amino acids in the feed.

A yet further object of the invention is the development of a high efficiency animal feed based on carbohydrates, protein, fats and, optionally, conventional additives containing from 5 to 150 ppm of the antibiotic Virginiamycin, zinc Bacitracin or flavophospholipol and a content of proteolytic enzymes in such an amount that the enzymatic activity is from 0.05 to 2.5 mTU/gm of said animal feed, in which animal feed the content of essential nutrients and possibly convertible energy is up to 20% less than what said content is in comparable standard animal feeds.

A still further object of the invention is the development of a method for efficient rearing of animals comprising feeding animals a high efficiency animal feed based on carbohydrates, protein, fats and, optionally, conventional additives, containing from 5 to 150 ppm of the antibiotic Virginiamycin, zinc Bacitracin or flavophospholipol and a content of proteolytic enzymes in such an amount that the enzymatic activity is from 0.05 to 2.5 mTU/gm of said animal feed, in which animal feed the content of essential nutrients and possibly convertible energy is up to 20% less than what said content is in comparable standard animal feeds.

These and other objects of the invention will become more apparent as the description thereof proceeds.

DESCRIPTION OF THE INVENTION

It has been surprisingly found that even optimally composed high potency (high efficiency) feeds can be further improved with respect to feed utilization and/or the weight gain attainable therewith by adding to these feeds certain antibiotics together with proteolytic enzymes.

The subject of the invention accordingly is an animal feed mixture based on carbohydrates, protein, and fats and, optionally, the customary additives, having a content of 5 to 150 ppm of the antibiotic Virginiamycin, zinc Bacitracin or flavophospholipol and of proteolytic enzymes in such an amount that an enzymatic activity of 0.05 to 2.5 mTU/gm is present, characterized in that the animal feed mixture has a deficiency in essential nutrient components and possibly convertible energy, based on comparable standard animal feed mixtures.

More particularly, the present invention relates to a high efficiency animal feed based on carbohydrates, protein, and fats and, optionally, the customary additives, having a content of 5 to 150 ppm of an antibiotic selected from the group consisting of Virginiamycin, zinc Bacitracin and flavophospholipol, and a content of proteolytic enzymes, particularly acid proteolytic enzymes, in such an amount that an enzymatic activity of 0.05 to 2.5 mTU/gm of said animal feed is present, characterized in that the animal feed mixture has a deficiency in essential nutrient components, more especially in proteins and essential amino acids, and possibly in convertible energy of up to 20 weight percent, preferably a deficiency of from 5 weight percent to 20 weight percent, based on comparable standard animal feed mixtures, as well as a method for efficient rearing of animals comprising feeding animals a high efficiency animal feed based on carbohydrates, protein and fats and, optionally, the customary additives, having a content of 5 to 150 ppm of an antibiotic selected from the group consisting of Virginiamycin, zinc Bacitracin and flavophospholipol, and a content of proteolytic enzymes, particularly acid proteolytic enzymes, in such an amount that an enzymatic activity of 0.05 to 2.5 mTU/gm of said animal feed is present, characterized in that the animal feed mixture has a deficiency in essential nutrient components and possibly convertible energy of up to 20 weight percent, preferably a deficiency of from 5 weight percent to 20 weight percent, based on comparable standard animal feed mixtures.

According to the invention, the above antibiotic and enzyme additives are utilized for producing animal food mixtures, whose content of essential nutrient components, such as raw protein and essential amino acids, and of convertible energy is at a level up to 20 weight percent, preferably a deficiency of from 5 weight percent to 20 weight percent, below the standard quantity required for the applicable animal species. The animal food mixtures thus produced correspond in the growth and nutrient utilization results obtained therewith to the standard feed mixtures containing no such deficiency. This result is extremely surprising and leads to a saving, particularly of proteins and essential amino acids, which ingredients represent a substantial cost factor in these food mixtures. The essential nutrient components of the animal feeds of the invention which can be employed in lower amounts than those customarily employed primarily consist of these proteins and essential amino acids.

The antibiotic Virginiamycin is a known antibiotic belonging to the peptolide group. It is produced from a strain of the fungus Streptomyces virginiae and consists of the components Type M (empirical formula $C_{28}H_{35}N_3O_7$) and Type S (empirical formula $C_{43}H_{49}N_7O_{10}$).

The antibiotic zinc Bacitracin belongs to the group of the polypeptide antibiotics. The commercial preparations are mixtures of various polypeptides with a zinc content up to 20%. The starting form of Bacitracin is produced in known manner from strains of Bacillus licheniformis.

The antibiotic flavophospholipol (Flavomycin ®) is a phorphorus-containing glycolipid of the composition: 48.5% C, 7.3% H, 37.3% O, 5.1% N, 1.8% P and a molecular weight in the alkaline range of 1700. It is formed by a group of gray-green Streptomyces, which are deposited in the American Type Culture Collection under the number ATCC 13879, ATCC 14762, ATCC 15503 and ATCC 15304.

Suitable proteolytic enzymes to be employed according to the invention are obtained above all by culturing microorganisms and separation of the enzymes produced from the culture solutions. The processes for this are known. Proteolytic enzymes can be used as produced, for example, from *Bacillus licheniformic, Bacillus natta, Bacillus subtilis,* etc. Especially preferred are acid proteases, e.g., from Aspergillus niger or those described in U.S. Pat. Nos. 3,674,644 and 3,677,898. Acid proteases from the genus Tramates or from Rhizopus rhizopodiformic according to U.S. Pat. No. 4,062,732 are particularly preferred. Such proteases have a particularly wide spectrum of action in the weakly acid range between pH 2.5 and 6.5. These acid proteases preferably have a pH range of 50% of maximum activity between a pH of 2.5 and a pH of 6.5.

Commercial feed mixtures are optimally composed for the special needs of the various animal species. They are customarily based on carbohydrates, proteins and fats with optional customary feed supplements or additives. The carbohydrates are chiefly from cereal components, corn or the like. The protein carriers are primarily extracted soybean meal pellets, fish meal, animal body meal, bran and the like. Essential amino acids which are lacking, for example, methionine, can be added. The fats are employed in the form of plant or animal fats or added in the form of waste fats. For body building, there are added further salts, such as dicalcium phosphate, calcium carbonate, and common salt. Optionally, the feed mix is balanced by the addition of trace elements, vitamins, ballast substances, etc. Also substances produced fermentatively, such as single cell proteins from petroleum fractions or alcohols, various yeasts, algae protein or others, possibly also substances recovered from waste materials may be a component part of the feed formulation, even to a considerable degree.

Normally, the protein content of a cockerel-fattening food diet for the feed period up to the age of four to six weeks amounts to about 22 weight percent, the lysine value to about 1.2 weight percent. According to the invention, however, a feed formulation equivalent to effectiveness to the standard fattening diet contains, in addition to the usual components adapted for certain animal species or feed use, about 18 to 20 weight percent raw protein, and 1 to 1.1 weight percent lysine, with an addition of 5 to 150 ppm, of one of the antibiotic Virginiamycin, zinc Bacitracin or flavophospholipol, and the proteolytic enzymes in a quantity such that the enzymatic activity is from 0.05 to 2.5 mTU/gm, preferably 0.2 to 0.5 mTU/gm. In particular, an antibiotic/enzyme combination of one of the above-mentioned antibiotics and an acid protease or protease mixture of fungus origin is employed. Other amino acids, such as menthionine and cystine, can likewise be used in reduced amounts, for example, about 0.8 to 0.85 weight percent, in the animal feeds of the invention.

Excellent results are obtained when:
(1) Virginiamycin is employed in amounts of 7.5 ppm to 15 ppm or 40 ppm to 80 ppm,
(2) zinc Bacitracin is employed in amounts of 7.5 ppm to 15 ppm or 80 ppm to 150 ppm, or
(3) when flavophospholipol is employed in amounts of 60 ppm to 100 ppm.

However, the improved results of the invention are obtained generally when any one of the antibiotics is employed in the broad range of 5 ppm to 150 ppm, together with the proteolytic enzymes.

Food mixtures of the type used in the invention but without antibiotic and enzyme additives unavoidably cause poor growth and food utilization results. Therefore, they could not be used in practice until now. However, the antibiotic and enzyme additives of the invention compensate for these depressed growth and utilization results by making these feeds with lower amounts of essential food components equivalent in nutritional capacity to standard foods. Thus, the prerequisite is created for the usage of what would otherwise be substandard food rations in intensive animal raising. The savings in proteins simultaneously associated with the practice of the invention represents a significant economic advantage and an important contribution toward conserving on the supply of proteins.

At the lower usage levels the active combination of Virginiamycin or zinc Bacitracin and proteolytic enzymes is successful especially in feed for fattening cockerels (broiler production). However, it can be useful also for all other kinds of animals where the use of Virginiamycin or zinc Bacitracin or flavophospholipol alone is already of advantage, for example, in hog fattening and in feed for laying hens.

At the higher usage levels the active combination of the mentioned antibiotics and enzymes is successful especially in piglet starter and raising feeds. In may, however, be useful also for all other animal species where the use of the mentioned antibiotics alone is already of advantage, such as in hog fattening, in laying hen feed, and in raising calves.

The antibiotic is expediently added to the feed in the form of a premix, for example, combined with extracted soybean meal pellets. By using mixed meal type feed compositions, the enzyme component can also be applied as a premix. Here, as carrier substance, any feed component can be used, for example, again extracted soybean meal pellets. When employing steam-tempered pelletizing of animal feeds, the admixture of the enzymes must occur in a suitably stabilized form to prevent deactivation by moisture and heat during the pelletizing. Such a method is the subject, for example, of United States Patent Application Ser. No. 760,358, filed Jan. 19, 1977.

To determine the enzymatic activity of the enzyme unit (TU), the proteolytic activity of the protease is ascertained by the known principle of Anson. A suitably diluted quantity of enzyme solution is incubated for 20 minutes at 40° C. with an equal volume of a 1.2% casein solution, the latter containing 0.6% lactic acid, 6 mols of urea and 0.1 mol of citric or acetic acid. The pH value of the casein solution is adjusted to 4.5 by addition of 2 N sodium hydroxide solution. After the incubation, the procedure is to admix with 0.4 N trichloroacetic acid in the volumetric ratio 1:1. The produced precipitate of undigested casein is filtered, and the protein cleavage products formed during degradation are ascertained in the filtrate by any method of protein determination. Suitable for this is, for example, the method described by Layne in Method of Enzymology 3 (1957), pages 448 ff.

For each test sample a blank value must be produced, wherein first trichloroacetic acid and then casein solution is added. This blank value indicates, in addition to the reagent blank value, the proportion of peptides of low molecular weight already present before the digestion in the enzyme solution. The difference between main and blank value is then compared, following the indicated method, with the extinction, which is given by a predetermined amount of tyrosine. This amount of tyrosine is then a measure of the proteolytic activity of the enzyme being determined. One enzyme unit (TU) is that amount of enzyme which releases in one minute from the casein solution the cleavage products which have the same extinction value as 1 M tyrosine solution. It is customary to express this in $mTU = 10^{-3}$ TU.

EXAMPLES

The following examples are illustrative of the invention without being limitative in any respect. All percentages in the following examples are percent by weight.

EXAMPLE 1

360 male one-day-old chicks of Lohmann origin were raised on soil for six weeks and fed with three different food mixtures having the following compositions designated as Rations I to III:

Ration I 21.0% raw protein
1.2% lysine
0.86% methionine and cystine
12 ppm zinc Bacitracin
No enzymes.

Ration II 18.0% raw protein
1.08% lysine
0.82% methionine and cystine
12 ppm zinc Bacitracin
No enzymes.

Ration III

Same as Ration II, but with 0.3 mTU/gm acidic proteases from Aspergillus niger and Rhizopus rhizopodiformis.

After conclusion of the test, the final weight of the animals and their feed utilization were determined. The "feed utilization" is the ratio of feed consumption to the weight gain.

TABLE I

| Feed Composition | Ration I (%) | Rations II, III (%) |
|---|---|---|
| Soybean meal pellets | 35.00 | 26.00 |
| Corn | 50.55 | 61.53 |
| Meat bone meal | 3.00 | 3.00 |
| Fat | 6.60 | 4.57 |
| Dicalcium phosphate | 2.00 | 2.10 |
| Calcium carbonate | 0.75 | 0.75 |
| Common salt | 0.30 | 0.30 |
| DL-methionine | 0.30 | 0.15 |
| Vitamin and trace element premix | 0.50 | 0.50 |
| Antibiotic or antibiotic/enzyme premix | 1.00 | 1.00 |
| | 100.00 | 100.00 |

RESULTS

| | Final Weight (gms) | Feed Utilization |
|---|---|---|
| Ration I | 1353 | 1.95 |
| Ration II | 1254 | 2.03 |
| Ration III | 1367 | 1.95 |

EXAMPLE 2

270 male one-day-old chicks of Lohmann origin were raised in a battery for six weeks and fed with three different food mixtures having the following compositions designated as Rations I to III:

Ration I 22.0% raw protein
1.2% lysine
0.86% methionine and cystine
15 ppm Virginiamycin
No enzymes.

Ration II 18.0% raw protein
0.95% lysine
0.8% methionine and cystine
15 ppm Virginiamycin
No enzymes.

Ration III

Same as Ration II, but with 0.42 mTU/gm acidic proteases from Aspergillus niger and Rhizopus rhizopodiformis.

After conclusion of the test, the final weight of the animals and their feed utilization were determined. The "feed utilization" is the ratio of feed consumption to the weight gain.

TABLE 2

| Feed Composition | Ration I (%) | Rations II, III (%) |
|---|---|---|
| Soybean meal pellets | 32.70 | 20.70 |
| Corn | 48.56 | 62.87 |
| Rape seed pellets | 5.00 | 5.00 |
| Animal body meal | 5.00 | 5.00 |
| Soybean oil | 6.00 | 3.50 |
| Dicalcium phosphate | 1.20 | 1.40 |
| Calcium carbonate | 0.63 | 0.60 |
| Common salt | 0.24 | 0.24 |
| DL-methionine | 0.17 | 0.19 |
| Vitamin premix | 0.20 | 0.20 |
| Trace element premix | 0.20 | 0.20 |
| Antibiotic or antibiotic/enzyme premix | 0.10 | 0.10 |
| | 100.00 | 100.00 |

RESULTS

| | Final Weight (gms) | Feed Utilization |
|---|---|---|
| Ration I | 1402 | 1.81 |
| Ration II | 1319 | 1.90 |
| Ration III | 1411 | 1.82 |

The above two examples clearly demonstrate that the presence of both the antibiotic Virginiamycin or zinc Bacitracin and proteolytic enzymes in the feed of baby chicks increase both the final weight and feed utilization ratio despite the below normal raw protein and essential amino acid content of the feed. Comparable results are obtained with feed for hog raising and feed for laying hens.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A method for efficient rearing of cockerels comprising feeding cockerels a high efficiency animal feed containing carbohydrates, protein and fats and optionally conventional additives, having a content of 5 to 150 ppm of an antibiotic selected from the group consisting of Virginiamycin, zinc Bacitracin and flavophospholipol, and a content of acid proteolytic enzymes in such an amount that an enzymatic activity of 0.05 to 2.5 mTU/gm of said animal feed is produced, wherein said animal feed has a deficiency in essential nutrient components selected from the group consisting of raw protein, essential amino acids, and a mixture thereof, and in convertible energy of from 5 weight percent to 20 weight percent, based on standard animal feed mixtures.

2. The method of claim 1 wherein said proteolytic enzymes are acidic proteases with a wide spectrum of action in the range of between a pH of 2.5 and 6.5.

3. The method of claim 2 wherein said acidic proteases are produced from Aspergillus niger, from the genus Tramates or from Rhizopus rhizopodiformis.

4. The method of claim 1 wherein said antibiotic is present in an amount of from 10 to 15 ppm.

5. The method of claim 1 wherein said enzymatic activity is from 0.2 to 0.5 mTU/gm of said animal feed.

* * * * *